United States Patent

Ona

[19]

[11] Patent Number: 6,131,431
[45] Date of Patent: Oct. 17, 2000

[54] PIPE MEMBER, METHOD AND APPARATUS FOR MANUFACTURING THE PIPE MEMBER

[75] Inventor: Hiroshi Ona, Hachioji, Japan

[73] Assignee: Takushoku University, Tokyo, Japan

[21] Appl. No.: 09/049,181

[22] Filed: Mar. 27, 1998

[30] Foreign Application Priority Data

Mar. 28, 1997 [JP] Japan ..................................... 9-078512

[51] Int. Cl.$^7$ .................................................. B21D 5/12
[52] U.S. Cl. .................................. 72/176; 72/183; 72/52; 52/108
[58] Field of Search ................................. 72/52, 51, 176, 72/183; 52/108; 242/390.2; 138/119

[56] References Cited

U.S. PATENT DOCUMENTS

| | | | |
|---|---|---|---|
| 2,315,640 | 4/1943 | Morse | 52/108 |
| 3,144,104 | 8/1964 | Weir | 72/183 |
| 4,018,397 | 4/1977 | Rusch | 52/108 |
| 4,265,690 | 5/1981 | Loweenhar | 156/161 |
| 4,796,797 | 1/1989 | Nakako | 72/52 |
| 5,725,026 | 3/1998 | Maimeets | 138/97 |

FOREIGN PATENT DOCUMENTS

| 94429 | 6/1982 | Japan | 72/52 |
|---|---|---|---|

OTHER PUBLICATIONS

J.D. MacNaughton, Unflurlable Metal Structures for Spacecraft, The De Havilland Aircraft of Canada Ltd. Apr. 1963.

*Primary Examiner*—Daniel C. Crane
*Attorney, Agent, or Firm*—Pillsbury Madison & Sutro Intellectual Property Group

[57] ABSTRACT

There is disclosed a pipe member rolled up as a coil and roll-formed, the pipe member made of material having a spring-back characteristics and having a specific residual stress distribution existing along a direction perpendicular to the rolling-up direction of said pipe member, the specific residual stress distribution being formed by being wounded around a longitudinal direction thereof by roll-forming, and when the member is unfurled out, two longitudinal edge portions of the member being overlapped to each other thus forming a pipe shape.

2 Claims, 7 Drawing Sheets

($\sigma_{ZX}$)

Fig.5B

($\sigma_{ZX}$)

Fig.5C

($\sigma_{ZX}$)

Fig.5D

($\sigma_{ZX}$)

Fig.5E

($\sigma_{ZX}$)

PIPE MEMBER, METHOD AND APPARATUS FOR MANUFACTURING THE PIPE MEMBER

BACKGROUND OF THE INVENTION

1. Field of the Invention

The present invention relates to a pipe member, a method and an apparatus for manufacturing the pipe member, particularly relates to a pipe member with high transportability.

2. Related Background Art

An idea regarding to a pipe member suitable for use in space was disclosed in paper titled "UNFURLABLE METAL STRUCTURES FOR SPACECRAFT" written by J. D. MacNaughton in "Canadian Aeronautics and Space Journal" issued on April, 1963. Pipes made of metals such as seam welded pipes are conventionally manufactured by a roll-forming method comprising, a break-down step for rolling up a plate into a pipe shape; a fin-pass forming step for increasing curvatures near two edges of the rolled up plate; a welding step for welding two edges of said rolled up plate together to form a pipe; and a sizing step for increasing shape and size accuracy of the pipe after welding. These steps are consecutively carried out in a factory with specific equipment to manufacture pipes. Then the pipes made in a factory or somewhere else are conveyed in the form of pipes to a site of use and assembled to a plant or the like.

SUMMARY OF THE INVENTION

An object of the present invention is to provide a pipe member that has high mass-productivity, is readily conveyed and can be easily made into a pipe on the site of use.

The pipe member of the present invention is conveyed as previously rolled up on a roll, and a pipe shape is formed naturally when the member is unwound on the site of use, thus a pipe can be made easily by welding its longitudinal edges together.

Further, Another object of the invention is to provide a pipe member rolled up as a coil and roll-formed, said pipe member made of material having a spring-back characteristics and having a specific residual stress distribution existing along a direction perpendicular to the rolling-up direction of said pipe member, the specific residual stress distribution being formed by being wounded around a longitudinal direction thereof by roll-forming, and when the member is unfurled out, two longitudinal edge portions of the member being overlapped to each other thus forming a pipe shape.

Further, another object of the present inventions is to provide a method for manufacturing a pipe member comprising the steps of:

supplying a long plate having a spring-back characteristics;

deforming said supplied plate by a roll-forming mechanism comprising plural stages of rolls to roll up said plate around a longitudinal direction of the supplied member to make longitudinal edge portions of the rolled up plate overlap each other; and pulling the plate deformed in said deforming step along a longitudinally proceedings direction under a predetermined force, and unfurling the wounded member to wind the uncurled member found a direction perpendicular to longitudinal direction onto a take-up bobbin having a rotary shaft in a direction perpendicular to said longitudinal direction.

A further object of the present invention is to provide an apparatus for manufacturing a pipe member comprising:

a roll-forming mechanism comprising plural stages of rolls for deforming a long plate so as to make its longitudinal edge portions, at least, overlap each other to eject the deformed member;

a take-up bobbin located on an outlet side of said roll-forming mechanism and having a rotary shaft perpendicular to a member-proceeding direction in said roll-forming mechanism and;

a truncated cone member between said roll-forming mechanism and said take-up bobbin and having a truncated cone shape of which diameter gradually increases from said roll forming mechanism side to said take-up bobbin side, said truncated cone member unfurling the deformed member.

Here, in the present invention, the roll-forming is performed so as to make a residual stress distribution of a specific pattern remained in the member having the spring-back property, then the member is wound in the form of a plate along its longitudinal direction and kept in that state, therefore the shape of a pipe is formed when the member is unwound. Further, while forming such a residual stress distribution in the pipe members, the take-up bobbin is rotated in a direction perpendicular to the winding direction for winding the member in the form of a plate along its longitudinal direction, thus the torsion of the member during the winding can be prevented, and a desired residual stress distribution can be formed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

An embodiment of the apparatus for manufacturing the pipe member according to the present invention will be described in details hereinafter with reference to drawings.

Figure 1A:
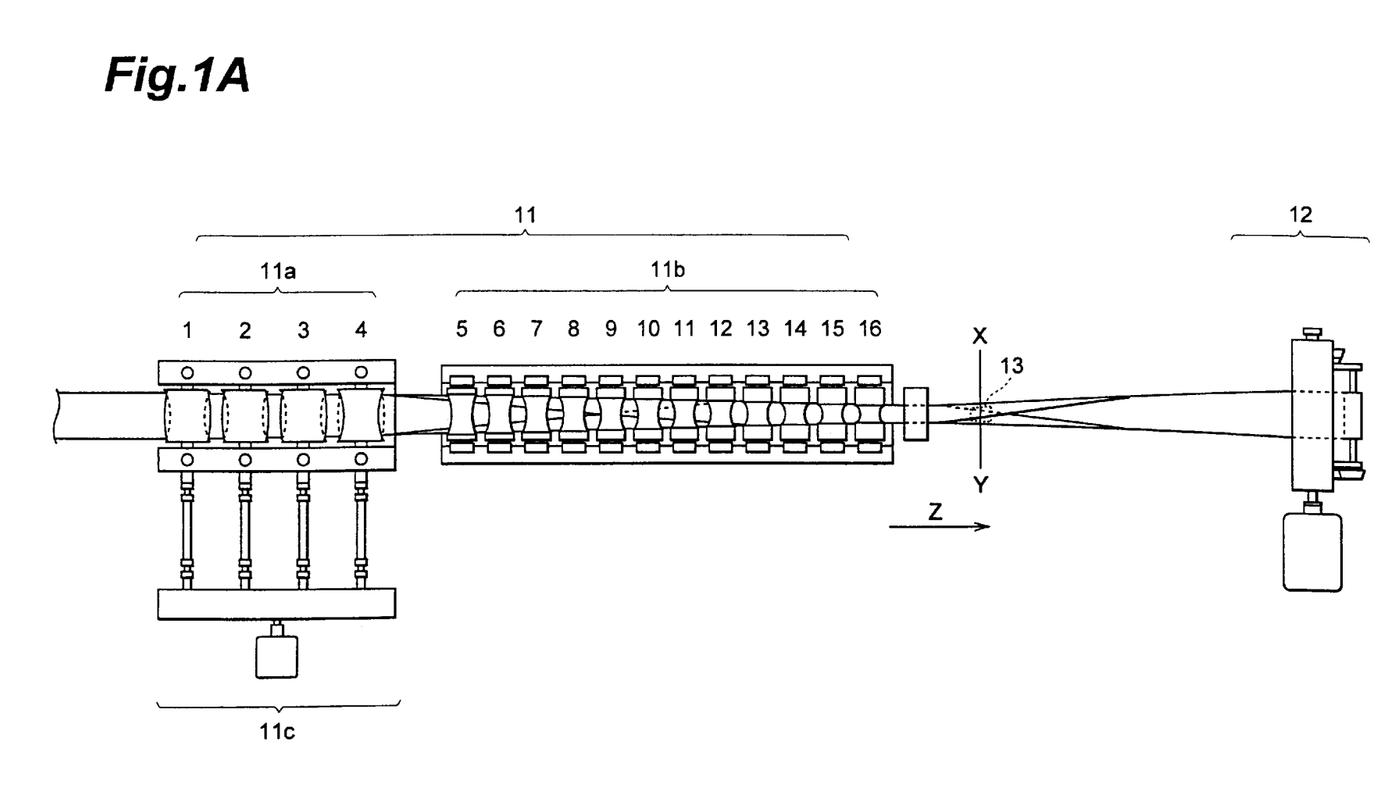
FIG. 1A is a drawing showing an embodiment of the apparatus for manufacturing the pipe member according to the present invention.

FIG. 1A is a generally plan view showing the apparatus for manufacturing the pipe member. The apparatus for manufacturing the pipe member comprises, as shown in FIG. 1A, a member-supply member (not shown) for supplying a member having spring-back property, for example, band-shaped stainless steel (specifically, those having a high spring-back such as SUS304, spring steel plate, titanium steel, shape memory alloys and so on); a cold roll-forming device 11 comprising a plurality of stages for deforming the bank-shaped plate supplied by the supply member to be in the shape of a pipe and delivering the same out; a truncated cone shaped member 13 for unfurling pipe-like deformed plate (as shown in FIG. 1D); and take-up bobbin member 12 for winding the member which is unfurled in the truncated cone member 13 wherein the member is deformed so as to be rolled up as a coil shape.

First, in the member-supply member, a thin steel sheet plate such as the stainless steel, for example, a spring steel formed by subjecting SUS 304 to a heat treatment, is rolled up to form a shape of a roll, and the stainless steel can be supplied continuously.

Figure 1B:
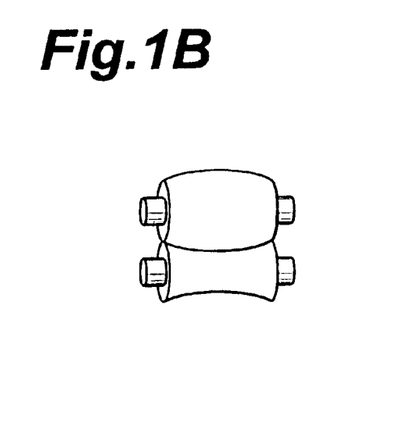
FIG. 1B shows a shape of rolls in the driving cold roll-forming portion of the apparatus shown in FIG. 1A.
Figure 1C:
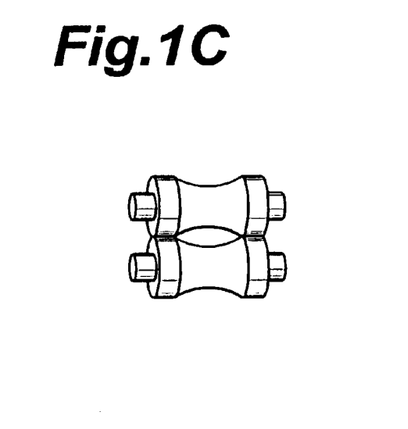
FIG. 1C is a shape of rolls in the non-driving cold roll-forming portion of the apparatus shown in FIG. 1A.
Figure 1D:
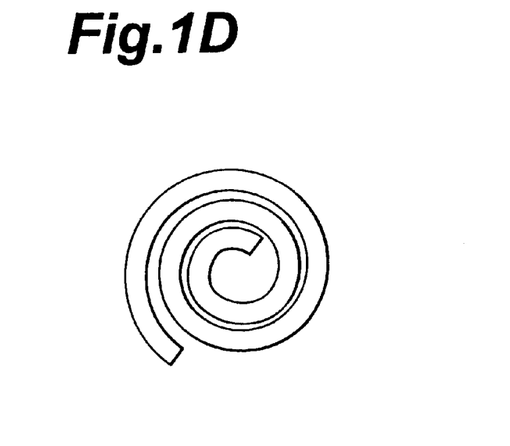
FIG. 1D is a sectional view of the plate wounded by the roll-forming device.
Figure 2A:
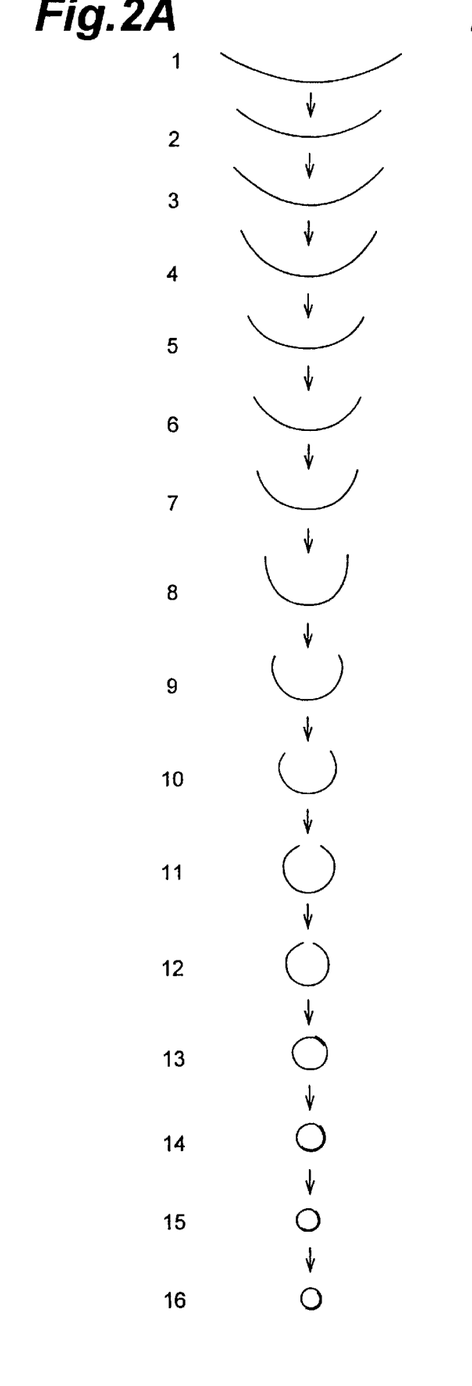
FIGS. 2A and 2B are a chart showing the forming states at each roll stage in the roll-forming device of the apparatus shown in FIG. 1A.
Figure 2B:
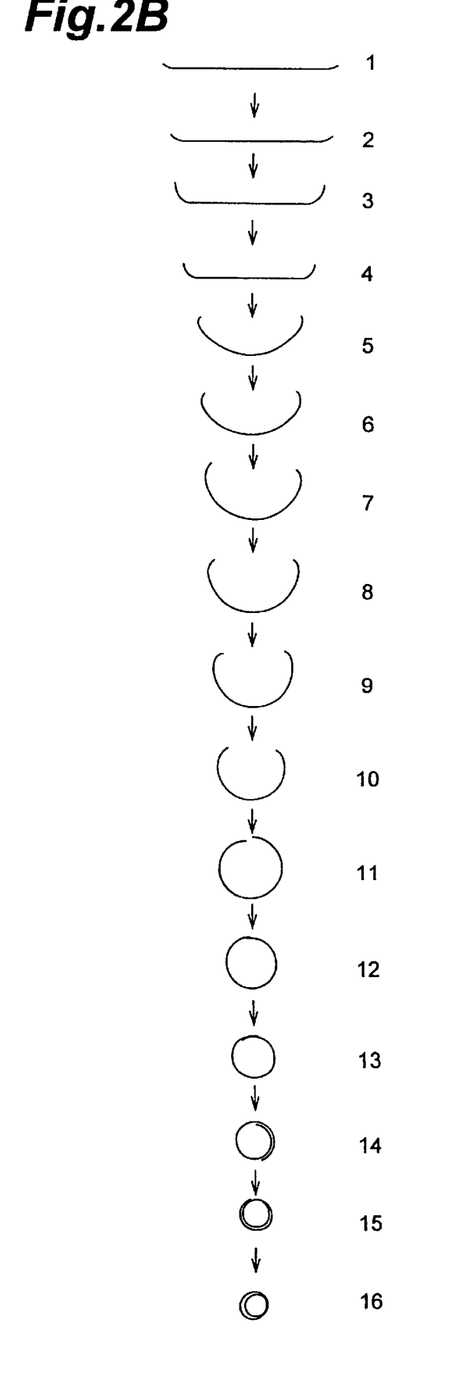
Figures 4A, 4B:
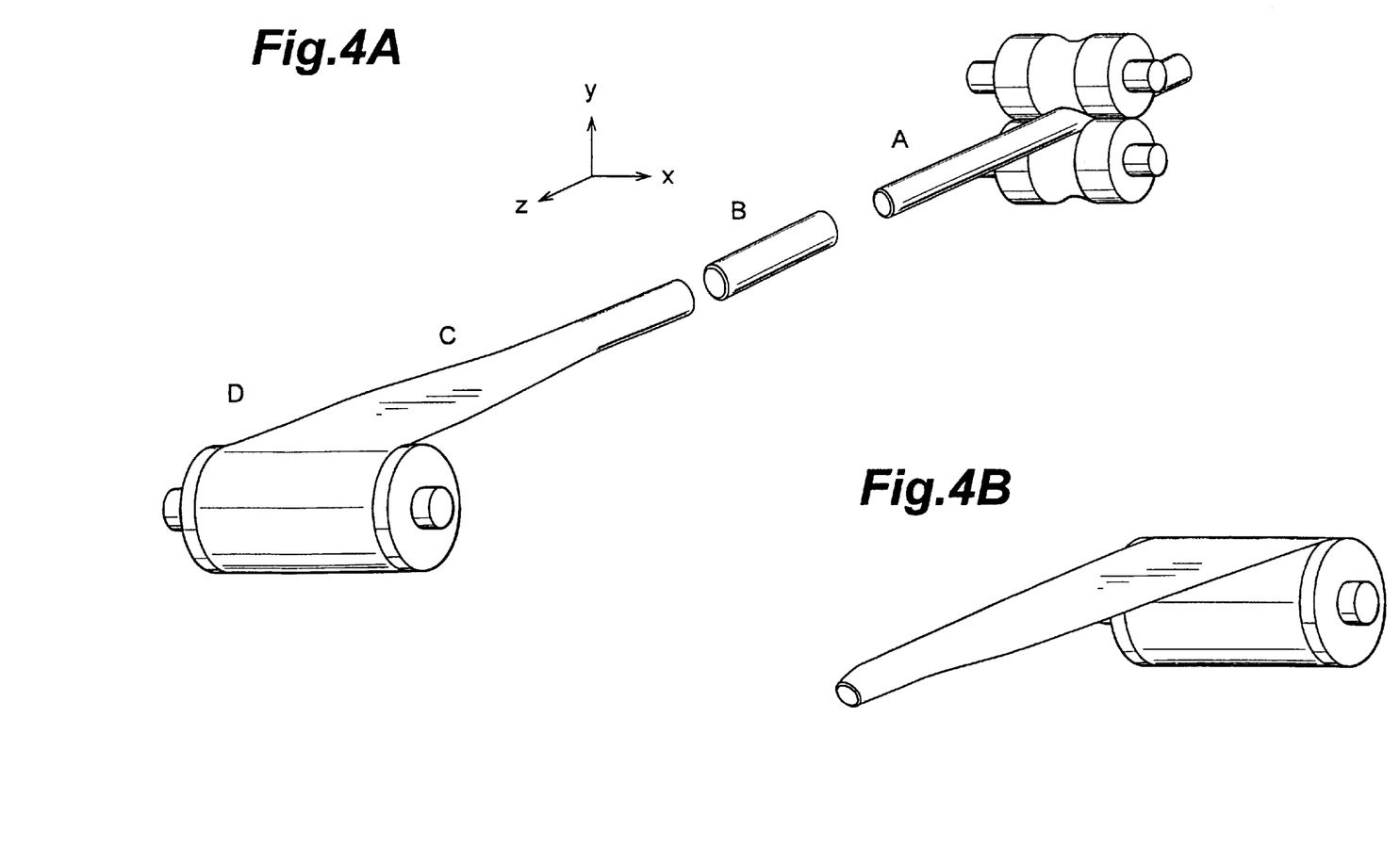
FIGS. 4A and 4B are drawings showing the appearance of the member in each step of the manufacturing method according to the present invention.

Roll-forming device 11 comprises a driving cold roll-forming portion 11a for bending the plate to a certain degree by sandwiching the members between two rolls as shown in FIG. 1B; and a non-driving cold roll-forming portion 11b, as shown in FIG. 1C, comprising a plurality of stages of combined rolls with empty spaces therebetween for deforming the plate which has been bent to a certain degree so as to roll up the plate and to, at least, make its longitudinal edge portions (in Z-direction in FIG. 4A) overlap each other as shown in FIG. 1D. Further, driving cold roll-forming portion 11a is so constructed as to drive an upper and a lower shafts of each roll 1–4 via a universal joint by driving force from a motor (not shown) through a gear box 11c. On the other hand, non-driving cold roll-forming portion 11b does not comprise a driving mechanism. The member proceeds in this portion is pulled by a take-up tension from the take-up bobbin member 12 and deformed to form a circular section by rolls 5–16. Advancing states of the deformation of the member in roll-forming device 11 are shown in FIG. 2A and FIG. 2B. FIG. 2A shows a case wherein the member is rolled up gradually in driving roll-forming portion 11a, while FIG. 2B shows a case in which the edge portions are first formed in driving cold roll-forming portion 11a, then the member is deformed by sandwiching the same horizontally between the front six stages of non-driving cold roll-forming portion 11b as lateral rolls, and further deformed as being rolled up by sandwiching the same vertically between the rear stages from stage 11 to stage 16 as vertical rolls. Here, shown in FIG. 2B is a better method to deform the member to form a circular cross section. In the present apparatus, the member is in the form of, at least, two-plies, for example, from 2.5 to 3 or 5-plies when it is delivered from the final stage of the roll 16 of roll-forming device 11 as shown in FIG. 2A and FIG. 2B. An adjusting mechanism is provided in the roll-forming device 11 for adjusting intervals between each of rolls 1–16.

Figure 1E:
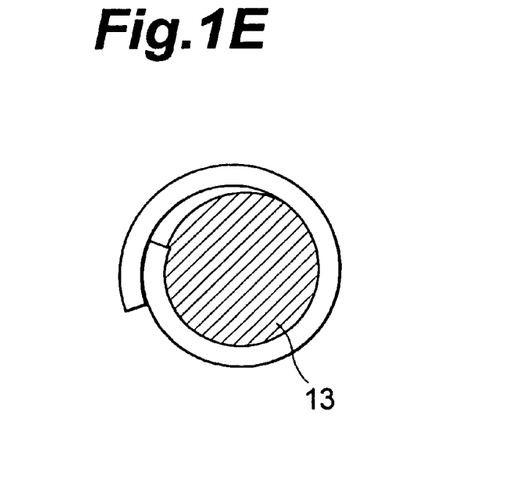
FIG. 1E is a sectional view of the wounded plate unfurled by a truncated cone shaped member of the apparatus shown in FIG. 1A.

The truncated cone member 13 is provided between the roll-forming device 11 and the take-up bobbin member 12 and it has the diameter in a plane perpendicular to the plate proceeding direction (Z-direction) which become larger in a direction from the roll-forming device 11 to the take-up bobbin member 12. The truncated cone member 13 unfurls the plate supplied from the roll-forming device 11 and wounded around a longitudinal direction thereof in the roll-forming device 11, as shown in FIG. 1E.

Figure 3A:
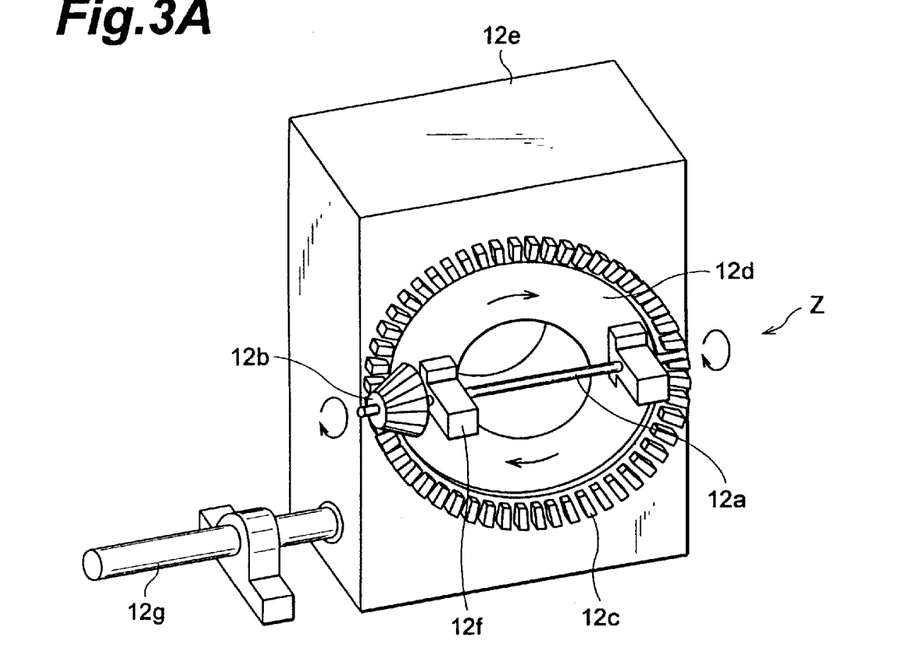
FIGS. 3A and 3B are drawings showing the structure of the take-up bobbin member of the apparatus shown in FIG. 1A.
Figure 3B:
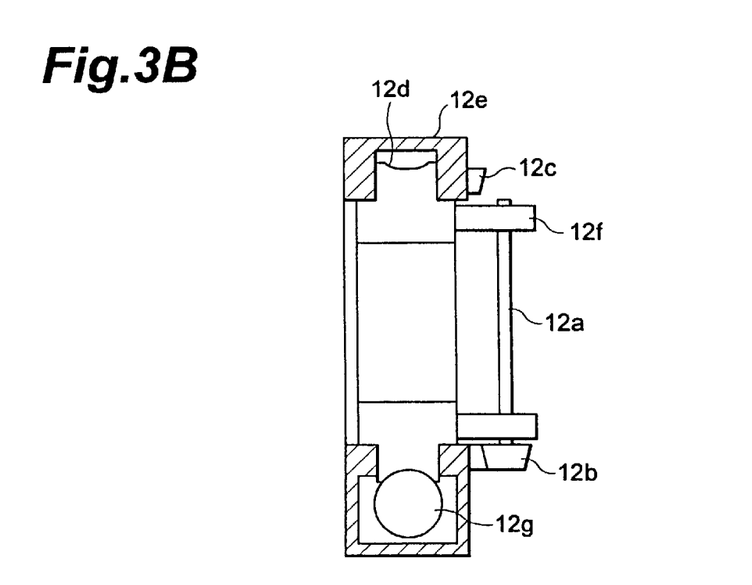

The take-up bobbin member 12 has functions to twist and to pull the member deformed in roll-forming device 11, and further to wind the member, which is rolled up to form a pipe shape in the roll-forming device 11, in the form of a plate along its longitudinal direction. For attaining these functions, as shown in FIG. 3A and FIG. 3B, a rotary shaft 12a is disposed to rotate the take-up bobbin (not shown) for winding, a bevel gear 12b for rotating said rotary shaft 12a about an axis of z-rotation direction is fixed to one end of the rotary shaft 12a, and a bevel gear 12c engaging with the bevel gear 12b is disposed in a main body 12e of the take-up bobbin member 12. Further, in this take-up bobbin member 12, a worm wheel 12d is disposed for rotatably supporting the rotary shaft 12a via a stand 12f, and the worm wheel 12d is so constructed that can be rotationally driven by an external drive means through a worm gear 12g. Then, the worm wheel 12d is rotated by rotating the worm gear 12g, and the rotary shaft 12a supported thereon rotates in the winding direction while rotating about the axis of z-rotation direction perpendicular to the rotary shaft 12a. Here, a rotational angular velocity of rotary shaft 12a is preferable to be in conformity with a rotational angular velocity of the member when it is delivered from the final stage of the roll, and said rotational angular velocity of the member is obtained based on a conveying speed of the member and an angle of the rolled-up member during this period. Therefore, when the member is wound to the take-up bobbin along the torsion thereof generated in the cold roll-forming process, an occurrence of unnecessary torsion of the wound member can be avoided.

Owing to the above-described double rotations, the member delivered from the roll-forming device 11 can be simultaneously provided with torsion and wound in the form of a plate along its longitudinal direction while applying a tension thereto. Specifically, the member used in the embodiment is a bank plate of stainless steel for springs (thickness of the plate: 0.1 mm; width of the plate: 40 mm; tensile strength: 1255 Mpa; yield stress: 1299 Mpa, Young's modulus: 168 Gpa). The pipe member was manufactured under such conditions that a radius of the edge portion first formed by the method shown in FIG. 2B is 2 mm, a speed for feeding the member is 1 m/min, a winding tension is 50 to 60 kgf and the rotating speed in the take-up bobbin member is 0.025 rad/sec, and the pipe member is wound onto and further unwound from the bobbins, thus a pipe having a diameter of 6.3 mm was successfully formed.

Figure 5A:
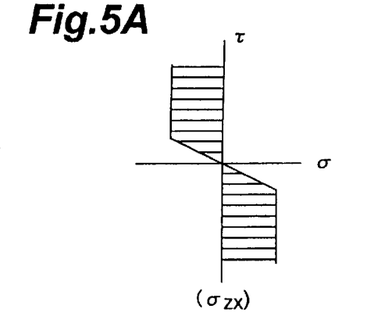
FIGS. 5A to 5F are graphs showing the residual stress distributions and stress-deformation states in each of the steps shown in FIGS. 4A and 4B; and, FIG. 6 is a graph showing the relationship between the radius of the final roll in the roll-forming device and the radius of the pipe when it is formed as being unwound after the manufacture of the pipe member.
Figure 5B:
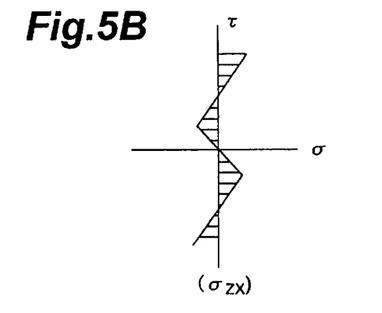
Figure 5C:
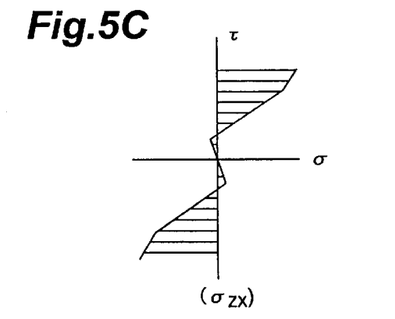
Figure 5D:
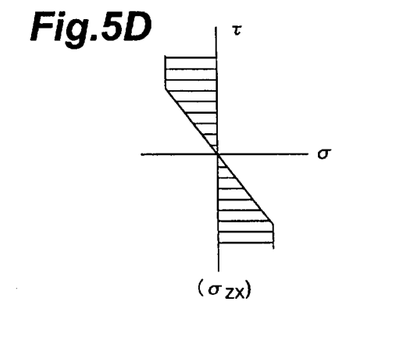

Next, the residual stress distributions in each of steps for manufacturing the pipe members with the above-described apparatus were obtained theoretically, and the results thereof are shown in FIG. 4D, FIG. 5A to FIG. 5D. Visual states of the pipe member in each of the manufacturing steps are shown in FIG. 4A, and the residual stress distributions in a direction of the thickness in each of manufacturing steps obtained theoretically are respectively shown in FIG. 5A to FIG. 5D. FIG. 5D particularly shows a z-directional residual stress working in x axial plane in a state of the member being wound onto the bobbin. Additionally, the visual state and the residual stress distribution when the member is once wound onto the bobbin and then unwound to form a pipe shape are respectively shown in FIG. 4B and FIG. 5E. The residual stress distribution in a state of the member being unwound as a pipe as shown in FIG. 5E was estimated by superposing, a component of converting the residual stress shown in FIG. 5D into the x-directional stress working in z-axial plane and a component of the stress due to the spring-back after unwinding, upon the state shown in FIG. 5C.

According the states shown in the drawings, it is presumable that, in respect of the member having the residual stress distribution as shown in FIG. 5D and wound in the form of a plate along its longitudinal direction, a pipe shape can be formed when the member is unwound. Here, based on a qualitative analysis of the residual stresses in each of above-described steps, the deformation of the member is estimated proceeding along a path shown in FIG. 5F. Namely, the roll-formed member plate is first plastically deformed to have a stress-deformation state as shown in FIG. 5A. However, the deformation is released after the member being out of the final stage of the roll, and it is considered as a negative bending being applied to the state shown in FIG. 5A. The stress-deformation state at this time is estimated to be that shown in FIG. 5B. Subsequently, the member rolled up to about 2.5 to 3-plies is once unrolled before being wound by the take-up bobbin member, so it is considered that the member further receives the negative bending from the state shown in FIG. 5C.

Further, since the member plate is in a completely planar form when it is wound by the take-up bobbin member, the member further receives the negative bending from the state shown in FIG. 5C, but the negative bending in FIG. 5C is not so strong as that in FIG. 5A.

Figure 5E:
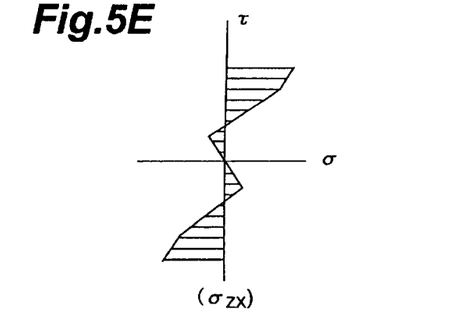
Figure 5F:
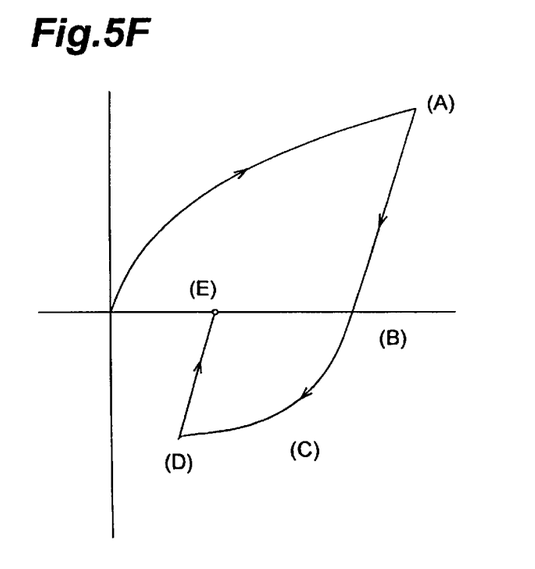

FIG. 5E shows a state in which the member tends to return to the initial state after the state shown in FIG. 5D due to the spring-back property.

Figure 6:
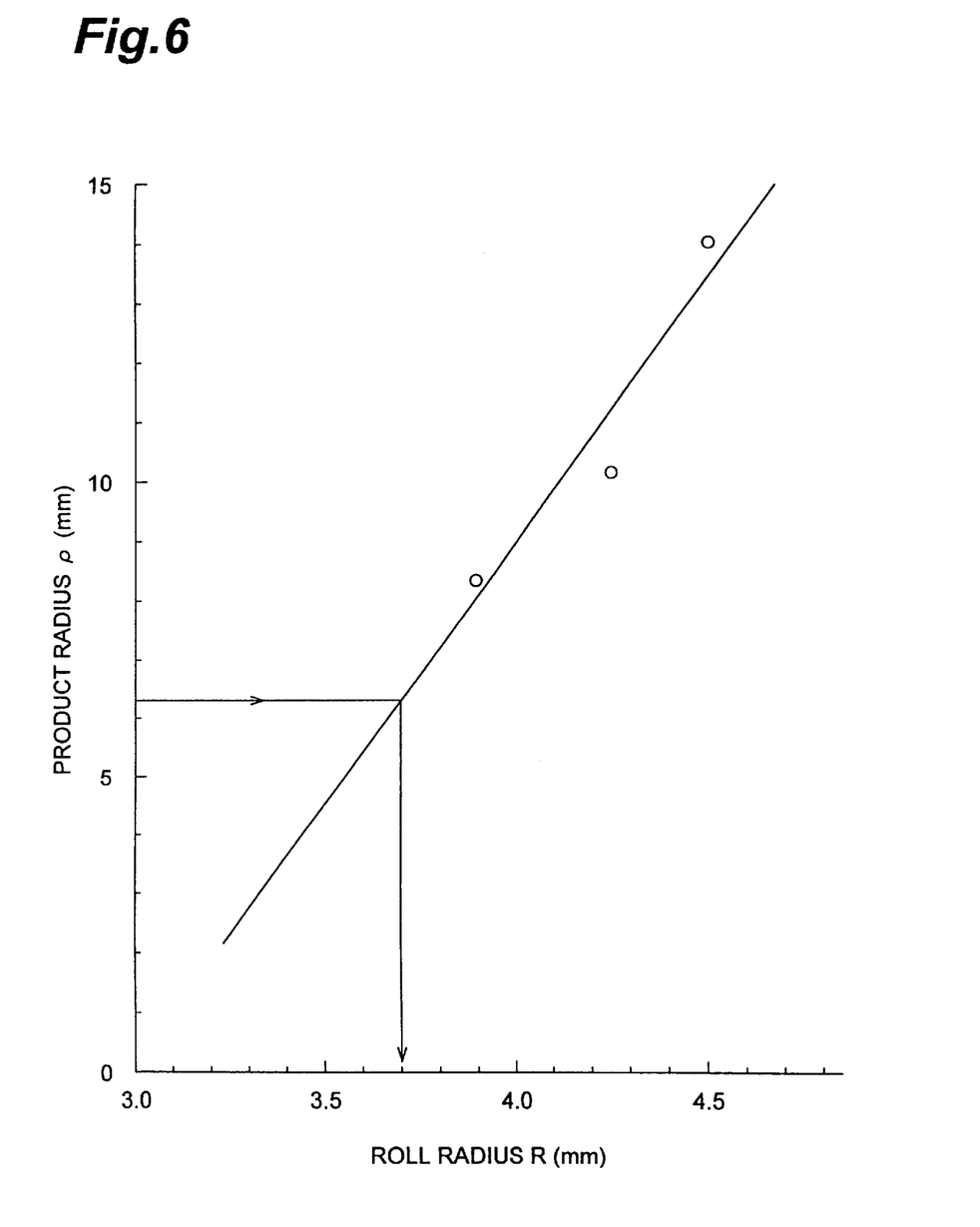

FIG. 6 is a graph showing a relationship between the radius of the final roll when the pipes member is formed using the above-described apparatus as well as method while changing the radius of the final roll, and the radius of a finished pipe when it is formed when unwound from the bobbin.

The pipe member, the method and the apparatus for manufacturing the pipe member according to the present invention have following effects owing to the above-described constructions.

Specifically, the pipe member according to the present invention can be conveyed as being wound to a bobbin in the form of a plate along its longitudinal direction, and a pipe can be easily formed only by unwinding the same from the bobbin at the time of use.

Further, by using the method and the apparatus for manufacturing the pipe member according to the present invention, a pipe member, which has a high transportability and can be easily formed to a pipe, can be manufactured with a good accuracy.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of manufacturing a material for a pipe member, said method comprising:

supplying a long plate having a spring-back characteristics;

deforming said supplied plate by a roll-forming mechanism comprising a plurality of stages of rolls, to roll up said long plate around a longitudinal direction thereof at least two windings to make longitudinal edge portions of the rolled up plate overlap each other; and pulling the plate deformed in said deforming step along a longitudinally proceeding direction under a predetermined force; and winding the pulled plate member onto a take-up bobbin having a rotary shaft in a direction perpendicular to said longitudinal direction with unfurling said plate rolled up in said deforming step, said method further comprising an applying step, said applying step comprises applying a twist to the plate pulled out in said pulling step so that the plate pulled by said pulling step may be wound around said take-up bobbin flatly.

2. A method according to claim 1, wherein said applying step comprises a step or rotating said take-up bobbin around an axis perpendicular to both of said longitudinal direction of said long plate and a direction of a rotational axis of said rotary shaft.

\* \* \* \* \*